(12) United States Patent
Taie et al.

(10) Patent No.: US 10,994,732 B2
(45) Date of Patent: May 4, 2021

(54) CONTROLLER FOR A VEHICLE

(71) Applicant: JAGUAR LAND ROVER LIMITED, Warwickshire (GB)

(72) Inventors: Mostafa Taie, Coventry (GB); Adam Adwan, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 117 days.

(21) Appl. No.: 16/172,972

(22) Filed: Oct. 29, 2018

(65) Prior Publication Data
US 2019/0126923 A1 May 2, 2019

(30) Foreign Application Priority Data

Nov. 2, 2017 (GB) .................................... 1718178

(51) Int. Cl.
*B60W 30/14* (2006.01)
*B60W 30/12* (2020.01)

(52) U.S. Cl.
CPC .......... *B60W 30/143* (2013.01); *B60W 30/12* (2013.01); *B60W 2420/42* (2013.01); *B60W 2420/52* (2013.01); *B60W 2554/4041* (2020.02); *B60W 2554/804* (2020.02); *B60W 2720/106* (2013.01)

(58) Field of Classification Search
CPC .... B60W 30/09; B60W 30/12; B60W 30/143; B60W 2554/00; B60W 2554/4041; B60W 2554/4044; B60W 2554/801; B60W 2554/804; B60W 2540/215; B60W 2420/42; B60W 2420/52; B60W 2720/10; B60W 2720/106; B60W 60/0015; B60W 2556/50; B60W 50/14

USPC .......................................................... 701/70
See application file for complete search history.

(56) References Cited

U.S. PATENT DOCUMENTS

| | | | |
|---|---|---|---|
| 2009/0192710 A1* | 7/2009 | Eidehall | B62D 15/0265 701/301 |
| 2012/0206275 A1 | 8/2012 | Mauderer | |
| 2015/0103159 A1* | 4/2015 | Shashua | G06K 9/00791 348/118 |
| 2015/0145694 A1* | 5/2015 | Dupont | B60Q 9/008 340/903 |

(Continued)

FOREIGN PATENT DOCUMENTS

DE 10 2012 222 301 A1 6/2013

OTHER PUBLICATIONS

Combined Search and Examination Report under Sections 17 and 18(3) for Application No. GB 1718178.5 dated Apr. 27, 2018.
(Continued)

*Primary Examiner* — Atul Trivedi
(74) *Attorney, Agent, or Firm* — Carlson, Gaskey & Olds

(57) ABSTRACT

A controller for controlling a vehicle, the vehicle comprising a detection means having a detection zone and a lateral non-detection region, the controller comprising: an input for receiving an object detection signal from the detection means; a processor arranged to generate a control signal for controlling a vehicle system in dependence on the received object detection signal; an output for outputting the control signal wherein the processor is arranged to generate a vehicle speed control signal to vary a vehicle speed about a current vehicle speed in order to bring an object within the lateral non-detection region into the detection zone of the detection means; and the output is arranged to output the vehicle speed control signal.

20 Claims, 6 Drawing Sheets

(56) References Cited

U.S. PATENT DOCUMENTS

| | | | |
|---|---|---|---|
| 2015/0166062 A1* | 6/2015 | Johnson | B60W 10/20 701/41 |
| 2015/0183430 A1* | 7/2015 | Schwindt | B60W 30/09 701/23 |
| 2015/0332114 A1* | 11/2015 | Springer | G06K 9/6267 348/148 |
| 2015/0354976 A1* | 12/2015 | Ferencz | G06K 9/3241 382/104 |
| 2016/0046290 A1* | 2/2016 | Aharony | B60W 10/04 701/41 |
| 2016/0231746 A1* | 8/2016 | Hazelton | G01S 13/867 |
| 2016/0318490 A1* | 11/2016 | Ben Shalom | B60T 7/18 |
| 2017/0008521 A1* | 1/2017 | Braunstein | G01C 21/3407 |
| 2017/0101092 A1 | 4/2017 | Nguyen Van et al. | |
| 2017/0153639 A1* | 6/2017 | Stein | G06K 9/00805 |
| 2017/0200061 A1* | 7/2017 | Julian | G06K 9/00791 |
| 2017/0235307 A1* | 8/2017 | Asakura | B60W 40/12 701/23 |
| 2019/0106102 A1* | 4/2019 | Igarashi | G06T 7/20 |
| 2019/0329777 A1* | 10/2019 | Rajab | B60W 60/00276 |
| 2020/0017124 A1* | 1/2020 | Camhi | G06N 20/00 |
| 2020/0049511 A1* | 2/2020 | Sithiravel | G01O 21/28 |
| 2020/0064483 A1* | 2/2020 | Li | G01S 17/87 |

OTHER PUBLICATIONS

Search Report for DE Application No. 10 2018 218 220.5 dated Jul. 23, 2019.

* cited by examiner

CONTROLLER FOR A VEHICLE

CROSS REFERENCE TO RELATED APPLICATION

This application claims priority to United Kingdom Application No. GB 1718178.5 filed on 2 Nov. 2017.

TECHNICAL FIELD

The present disclosure relates to a controller for a vehicle and particularly, but not exclusively, to a controller for controlling a vehicle lane assist/change system. Aspects of the invention relate to a controller, to a method of controlling a vehicle, and to a vehicle.

BACKGROUND

Modern vehicles commonly feature Advanced Driver Assistance Systems (ADAS) that aim to assist the driver in a variety of driving scenarios. These ADAS systems have become increasingly commonplace due to the technological developments in sensory technologies and the improved capabilities of on-board processing devices.

As a result, information gathered by these sensory systems can be used to improve the driver's situational awareness, to identify dangerous situations and to facilitate automated control of certain vehicle operations.

For example, an adaptive cruise control system can automatically control a vehicle's cruising speed by identifying nearby vehicles, monitoring the speed and proximity of the vehicles and adjusting the vehicle's cruising speed to maintain an optimal separation. Similarly, a collision avoidance system may identify obstacles ahead of or behind the vehicle and indicate these obstacles to the driver.

However, these ADAS systems rely on sensors that have a limited field of view through which they are able to transmit/receive signals or capture images.

Consequently, a vehicle may be equipped with various front, rear and side mounted sensors in order to identify objects in various locations surrounding the vehicle. Additional sensors increase the cost and complexity of the ADAS systems and present packaging challenges that affect the vehicle design.

The present invention has been devised to mitigate or overcome at least some of the above-mentioned problems.

SUMMARY OF THE INVENTION

According to an aspect of the present invention there is provided a controller for controlling a vehicle, the vehicle comprising a detection means having a detection zone and a lateral non-detection region, the controller comprising: an input for receiving an object detection signal from the detection means; a processor arranged to generate a control signal for controlling a vehicle system in dependence on the received object detection signal; an output for outputting the control signal wherein the processor is arranged to generate a vehicle speed control signal to vary a vehicle speed about a current vehicle speed in order to facilitate detection of a potential object in a lateral direction of the vehicle; and the output is arranged to output the vehicle speed control signal.

The controller is arranged to generate a vehicle speed control signal to vary the vehicle's speed about a current speed value in order to bring any object that may be within the non-detection region of the detection means into the detection zone of the detection means.

The input may be arranged to receive an input signal and the processor may be arranged to generate the vehicle speed control signal in dependence on receiving the input signal.

The input signal may comprise one or more of: a user command entered via a vehicle input device; a signal generated upon operation of a vehicle indicator system; a signal generated by an advance driver assistance system; a GPS signal; and an object detection signal from the detection means.

The input of the controller may include a first input for receiving the object detection signal and a second input for receiving the input signal.

The processor may be arranged to detect an object within the detection zone in dependence on the object detection signal received from the detection means; track the object; determine whether the object presents a hazard to lateral movement of the vehicle; generate the control signal for controlling the vehicle system in dependence on determining whether the object presents a hazard to lateral motion.

The object's motion may be tracked within the detection zone. This may include determining relative position and motion information. The controller may determine whether the object's relative speed will cause a collision/danger if the vehicle changes lanes or deviates from the current trajectory. The controller may track the object as it leaves the detection zone and assumes that the object occupies a position in the lateral blind zone, hence determines that the object will cause a collision/danger if the vehicle changes lanes.

Tracking the object may include determining one or more of a speed, position, acceleration or trajectory of the object based on the object detection signal.

The processor may be arranged to determine that the object presents a hazard to lateral movement of the vehicle if a determined trajectory of the object takes the object into the lateral non-detection region of the vehicle.

Determining whether the object presents a hazard to lateral movement of the vehicle may include: determining the relative motion of the object whilst the object remains within the detection zone and determining one or more of: a first likelihood of the object moving into the lateral non-detection region based on the relative motion; a second likelihood of the object occupying a position within the lateral non-detection region; and a third likelihood of the object returning into the detection zone.

The vehicle system may include an autonomous lane change system and the control signal may affect the control of the autonomous lane change system to prevent the vehicle from changing lanes whilst the object presents a hazard to lateral motion.

The vehicle system may include a lane change assistance system and the control signal may affect the control of the lane change assistance system to indicate the hazard to lateral motion of the vehicle.

Detecting the object within the detection zone may include identifying a vehicle by one or more of pattern recognition, colour detection or licence plate recognition.

The object detection signal may include one or more of: computer vision data, image data, radar signal data or LIDAR signal data.

The detection means may comprise one of more of: one or more cameras, LIDAR sensors or radar sensors.

The detection means may be arranged on the vehicle such that the detection zone includes a forward field of view and a rearward field of view and the lateral non detection region is situated in an area between the forward field of view and the rearward field of view.

The detection zone may include a vertical field of view spanning less than 35 degrees and the lateral non detection region forms outside of the vertical field of view. It is noted that the detection means on the vehicle may detect objects that are substantially within the same horizontal plane as the detection means. Such detection means may be limited to detecting objects within a vertical field of view of 35 degrees or less from such a horizontal plane. For high sided vehicles this field of view may not be sufficiently extensive to catch the underside of such vehicles when they are close to the vehicle comprising the detection means. In such an arrangement the non-detection zone forms above the vertical field of view limits of the detection means.

The detection zone may include a forward horizontal field of view in the direction of travel of the vehicle and a rearward horizontal field of view opposite to the direction of travel and the lateral non detection region may form outside the forward and rearward fields of view. In this arrangement the vehicle comprises detection means on the front and rear of the vehicle but has a "blind" spot on the sides of the vehicle which the forward and rear detection means does not cover.

The lateral non-detection region may comprise a region extending at least partially alongside the vehicle at all times.

The vehicle speed control signal may be arranged to control the vehicle speed in accordance with a variable speed sequence.

The variable speed sequence may include a random sequence of speed increments or decrements. The variable speed sequence may include a limited rate of acceleration or deceleration. The variable speed sequence may include increasing the vehicle speed to a first relative speed and decreasing the speed to a second relative speed. The variable speed sequence may further include a sustained period of time at the first relative speed or the second relative speed.

The variable speed sequence may depend on a user input. Alternatively, the variable speed sequence may depend on the input signal.

According to another aspect of the present invention there is provided a method of controlling a vehicle, the vehicle comprising a detection means having a detection zone and a lateral non-detection region, the method comprising: receiving at an input of a controller an object detection signal from the detection means; generating at a processor of the controller a control signal for controlling a vehicle system in dependence on the received objection detection signal; outputting at an output of the controller the control signal wherein the method comprises generating at the processor a vehicle speed control signal to vary a vehicle speed about a current vehicle speed in order to facilitate detecting a potential object in a lateral direction of the vehicle; outputting from the output the vehicle speed control signal.

The present invention extends to a computer program comprising instructions which, when the program is executed by a computer, cause the computer to carry out the method of the above aspect of the present invention. A computer-readable data carrier may have stored thereon such a computer program.

The invention extends to a vehicle comprising a controller according to the above aspect of the present invention.

According to a further aspect of the present invention there is provided a controller for controlling a vehicle, the vehicle comprising a detection means having a detection zone and a non-detection region, the controller comprising: an input for receiving an object detection signal from the detection means; a processor arranged to generate a control signal for controlling a vehicle system in dependence on the received object detection signal; an output for outputting the control signal wherein the processor is arranged to generate a vehicle speed control signal to vary a vehicle speed about a current vehicle speed in order to bring an object within the lateral non-detection region into the detection zone of the detection means; and the output is arranged to output the vehicle speed control signal.

The controller as described above, wherein: the processor comprises an electronic processor having an electrical input for receiving said one or more signals (object detection signal and/or input signal) received at the input of the controller; and an electronic memory device electrically coupled to the electronic processor and having instructions stored therein, and the processor may be configured to access the memory device and execute the instructions stored therein such that it is operable to generate a vehicle speed control signal to vary a vehicle speed about a current vehicle speed in order to bring an object within the lateral non-detection region into the detection zone of the detection means.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

An adaptive cruise control system may, for example, automatically control a vehicle's cruising speed. Sensory devices may identify nearby vehicles that are driving ahead of and to the rear of the vehicle and a processing device may monitor the speed and proximity of such vehicles. A controller device can receive the sensory information and adjust the vehicle's cruising speed accordingly to maintain an optimal separation. Similarly, a collision avoidance system may identify obstacles ahead of the vehicle and indicate these obstacles to the driver and/or provide corrective braking inputs.

More highly automated vehicles may be capable of enacting lane changes but in order to do so will need to have sufficient sensor coverage to perceive laterally located objects. One option would be to add additional sensors to the vehicle to support sensors present at the front and rear of the vehicle. However, it may be desirable to utilise sensors having different sensing modes and/or to avoid adding to the sensors on the vehicle (which may be associated with packaging, power and weight constraints and issues).

It is also noted that certain sensor types may have a limited field of view that would make it difficult to detect certain vehicle types that are close to the vehicle. It is further noted that traditionally vehicles have been fitted with sensors in the front and rear of the vehicle such that there is a lateral non-detection region relative to the vehicle. Additionally, even when present, side mounted sensors are often not configured for use in autonomous driving systems (it is noted that side mounted sensors in traditional vehicles may comprise ultrasonic or surround camera sensors which are not ASIL (automotive safety integrity level) rated) and additionally may have limited performance in adverse weather conditions.

Figure 1:
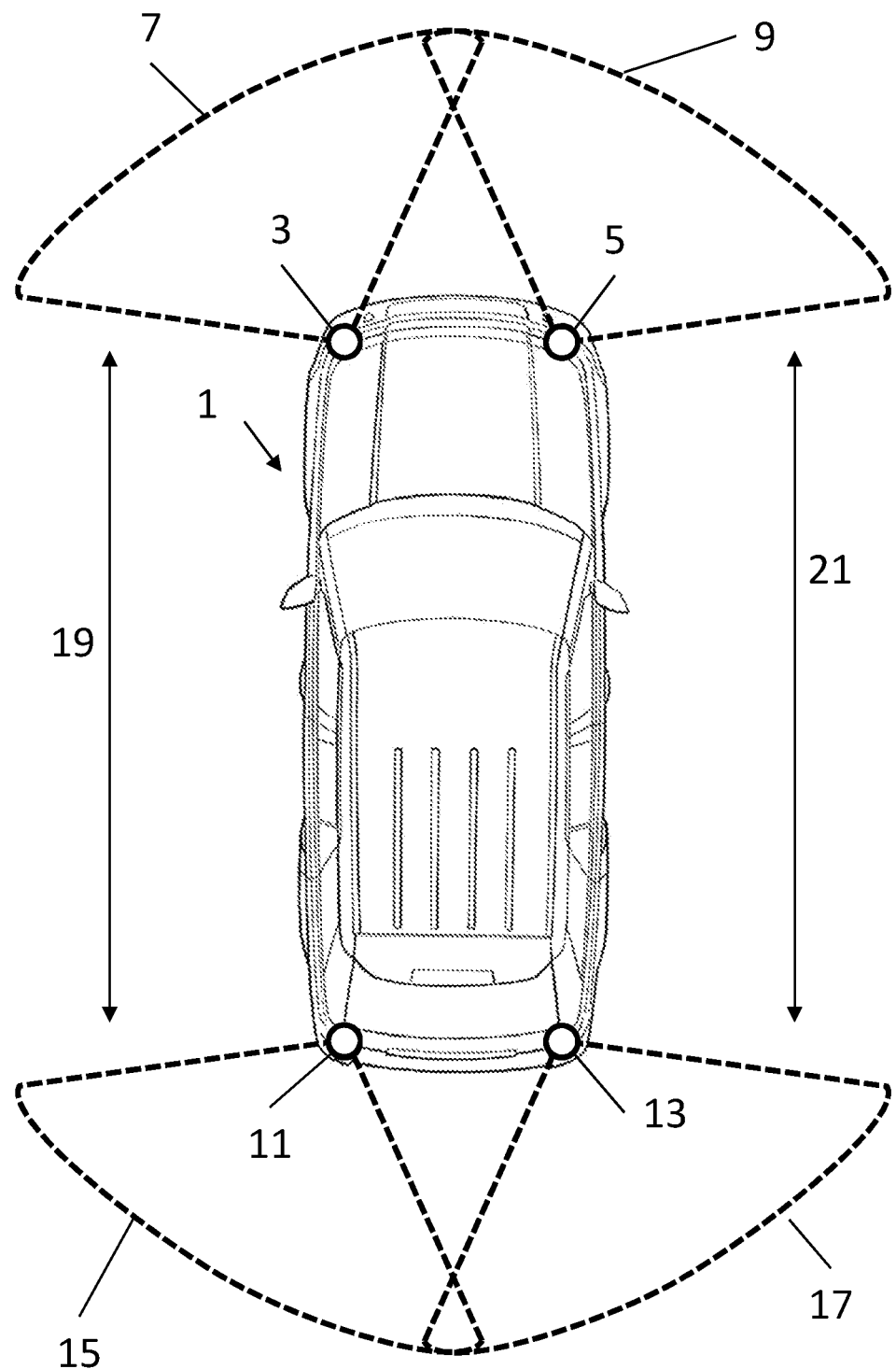
FIG. 1 shows a typical vehicle having forward facing and rearward facing sensors.

FIG. 1 shows a typical vehicle 1 having forward sensors (3, 5) each of which is associated with a sensing region (detection zones 7, 9 in FIG. 1) and rearward facing sensors 11, 13 each of which are associated with a sensing region (detection zones 15, 17 in FIG. 1). As shown in FIG. 1 the configuration of sensors (in other words the detection means 3, 5, 11, 13) means that there are lateral non-detection regions (19, 21).

It is noted that although the description of embodiments of the present invention refers to lateral non-detection regions it should be appreciated that this does not necessarily only mean that the vehicle comprising the controller 40 (described below) is unable to detect objects that are located laterally of the vehicle. It should therefore be appreciated that embodiments of the present invention encompass vehicles in which forward and rear sensors have a lateral "blind" zone, vehicles in which 360 degrees of sensor detection coverage is provided but a blind zone is nevertheless present (e.g. because of a failure or impairment within the sensor/detection means or because the detection means has a limited field of view lateral to the vehicle) and vehicles in which lateral object detection capabilities are provided by a different type of sensor to the forward and rearward facing sensors (e.g. the forward/rear sensors comprise LIDAR sensors and the lateral sensors comprise imaging based or ultrasonic based sensors).

The skilled person should also appreciate that embodiments of the present invention may be used in a standalone manner (e.g. where there are no other sensor systems on the vehicle that can be used for ADAS or autonomous driving uses) or in conjunction with other systems (in which case the embodiments of the present invention are providing a redundancy feature).

Figure 2:
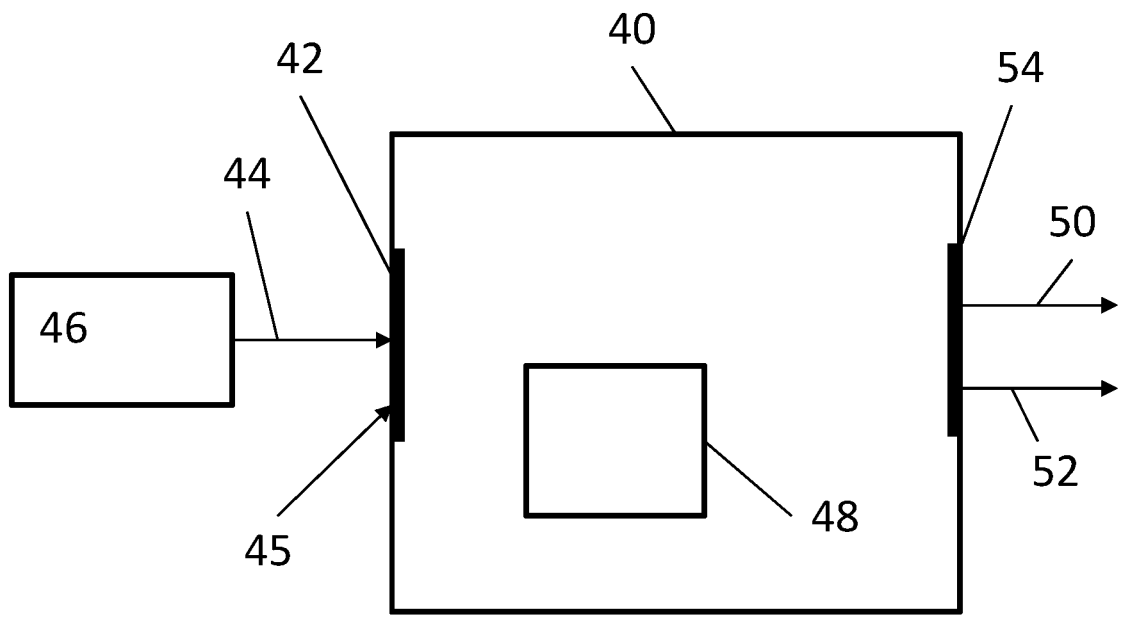
FIG. 2 shows a controller according to an embodiment of the present invention.

FIG. 2 shows a controller 40 in accordance with an embodiment of the present invention. The controller comprises an input 42 for receiving an object detection signal 44 from a vehicle detection means 46 (e.g. the sensors 3, 5, 11, 13 shown in FIG. 1).

The controller further comprises a processor 48 for generating a vehicle speed control signal 50 and a control signal 52 for controlling a vehicle system in dependence on the received object detection signal. The vehicle speed control signal 50 and control signal 52 are output via an output 54. An input signal 45 (described below) may also be received at the input 42.

The controller 40 may be incorporated into the vehicle shown in FIG. 1. The controller (or control unit) 40 may be arranged to receive sensor data from the sensors and to control one or more vehicle systems (e.g. driver alert systems, vehicle steering or braking systems etc.).

It is noted that the object detection signal 44 may comprise a processed signal from the detection means in which an object has been identified and the object detection signal 44 comprises details on the detected object or alternatively the object detection signal may comprise raw sensor data from the detection means. In the former case a processor (perhaps within the detection means) has processed the raw sensor data before it reaches the controller 40 and in the latter case the processor 48 within the controller 40 is arranged to process raw sensor data from the detection means 46.

The vehicle speed control signal 50 is arranged to change the vehicle's forward speed, e.g. in accordance with the speed profile 81 shown in FIG. 4 below.

Figure 3:
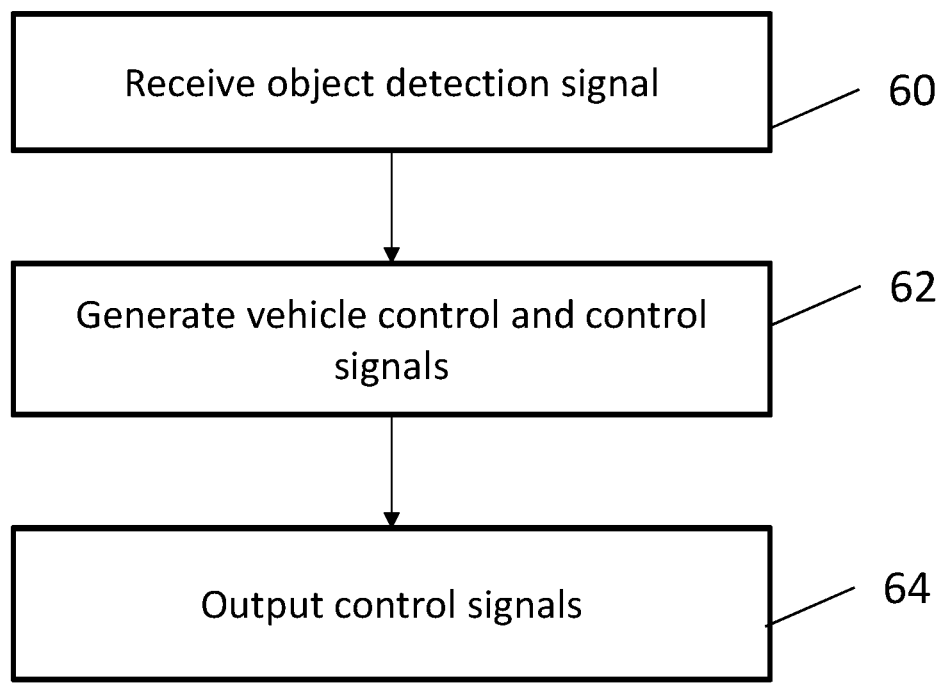
FIG. 3 shows a method of operating the controller of FIG. 2 according to an embodiment of the present invention.

FIG. 3 is a flow chart showing the operation of the controller of FIG. 2. In step 60 the controller receives object detection signals 44 at the input 42 from the detection means 46. In step 62 the processor 48 is arranged to generate a control signal 52 for controlling a vehicle system in dependence on the received object detection signals 44 and also to generate a vehicle speed control signal 50. In step 64 the generated signals are output from the output 54.

As noted above the object detection signals 44 may comprise a processed signal from the detection means in which an object has been identified and the object detection signal 44 comprises details on the detected object or alternatively the object detection signal may comprise raw sensor data from the detection means. It is also noted that the processor may receive raw sensor data from multiple sensors on the vehicle and may be arranged to fuse such data together before processing the data to determine the control signal to be output.

It is noted that the control signal 52 for controlling a vehicle system may comprise a control signal for a driver alert system (e.g. that there is another vehicle approaching the driver's vehicle in an adjacent lane) or may comprise a control signal for an advanced driver assist system (e.g. that may be capable of effecting an autonomous lane change). As such the control signal 52 may control the lateral motion of the vehicle in, for example, an autonomous highway driving environment. The control signal 52 may also be any other control signal for a vehicle based system (e.g. control for a display screen, for a comfort based system such as the air conditioning or any other HMI system within the vehicle). In one embodiment the control signal 52 may comprise the vehicle speed control signal 50.

Embodiments of the present invention operate to vary the vehicle speed by outputting a vehicle speed control signal 50 to a vehicle drive system. By varying the vehicle speed the relative speed between the vehicle and other road users/objects will also vary which will bring potential objects potentially initially in a lateral non-detection region into the field of view of the detection means 46 of the vehicle. In other words the other road users will either have a greater speed than the current vehicle in which case they will appear in the field of view of one of the front sensors 3, 5 or they will have a lower speed than the current vehicle in which case they will appear in the field of view of one of the rear sensors 11, 13.

Advantageously an object detection method based on varying the speed of the detecting vehicle means that it is not necessary to introduce additional hardware or sensors within the vehicle since changing the motion of the vehicle enables the existing sensor set to be used to detect if there are objects in the lateral direction from the vehicle.

Figure 4:
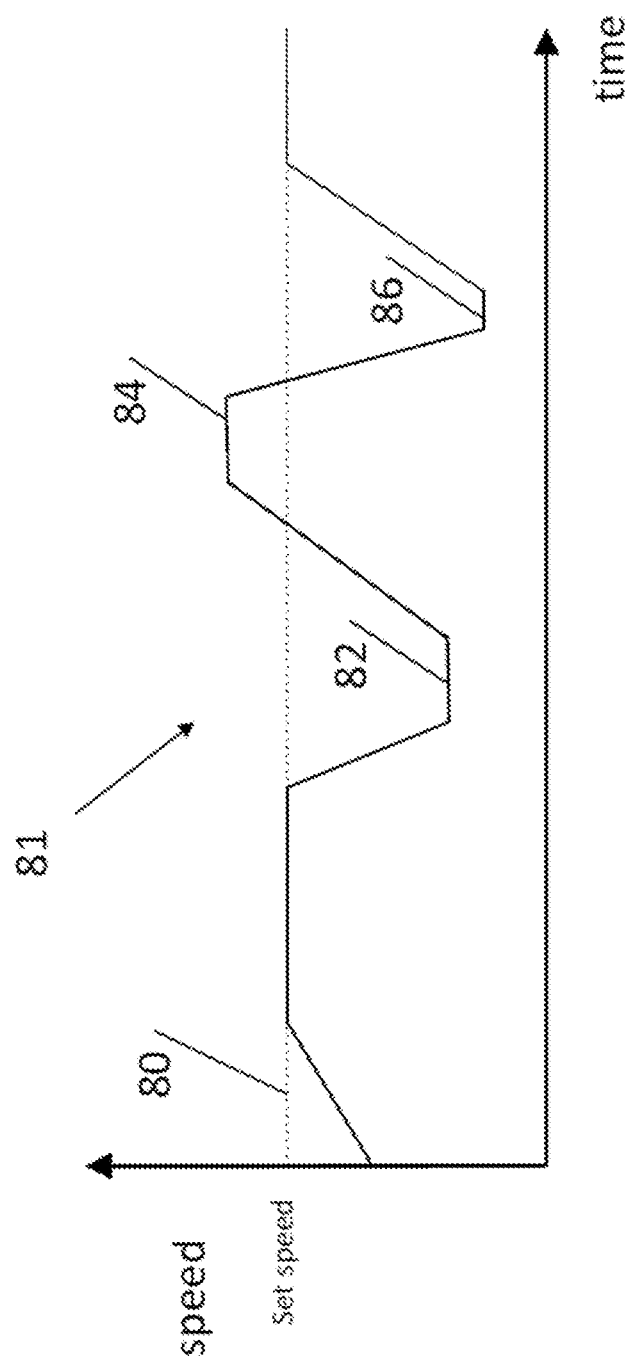
FIG. 4 shows a variable speed pattern in accordance with an embodiment of the present invention.

FIG. 4 shows an example of a variable vehicle speed pattern 81 that the controller may control the vehicle according to. The vehicle is set to a nominal speed level 80 and the vehicle speed control signal may be arranged to slow the vehicle down (82, 86) and speed the vehicle up (84) from this level.

It is noted that the processor 48 may be arranged to use a variable speed pattern that is randomly generated in order to mitigate against the possibility of a vehicle in an adjacent lane being controlled according to a similar manner. (If both vehicles utilised a standard variable speed pattern then they could conceivably match speed changes such that their delta speed would be insufficient to bring one vehicle into view of the detection means 46 of the other vehicle. Using a randomly generated vehicle speed control pattern would however mitigate against this possibility.)

A number of parameters relating to the variable speed pattern may be varied, including but not limited to: shape of the pattern, the profile of deceleration and acceleration phases, the maximum and minimum speeds (i.e. the delta speed about the set speed), the number of repetitions of the pattern, the time spent at the maximum speed at each speed peak, the time spent at the minimum speed at each speed minimum.

The controller 40 may be arranged to periodically initiate a variable speed pattern for a vehicle. Alternatively, the controller may arrange to generate a variable speed control signal in response to an input 45 received at the input 42 of the controller 40. The input 45 received may be: driver generated; generated in response to the vehicle traversing a predefined location; generated in response to the detection of an object by the detection means 46; generated following a lane change or in response to a request for a lane change. The variable speed pattern may thus be initiated irrespective of whether it is known that an object is potentially present or not, that is independently of any output from detection means of the vehicle.

Figure 5A:
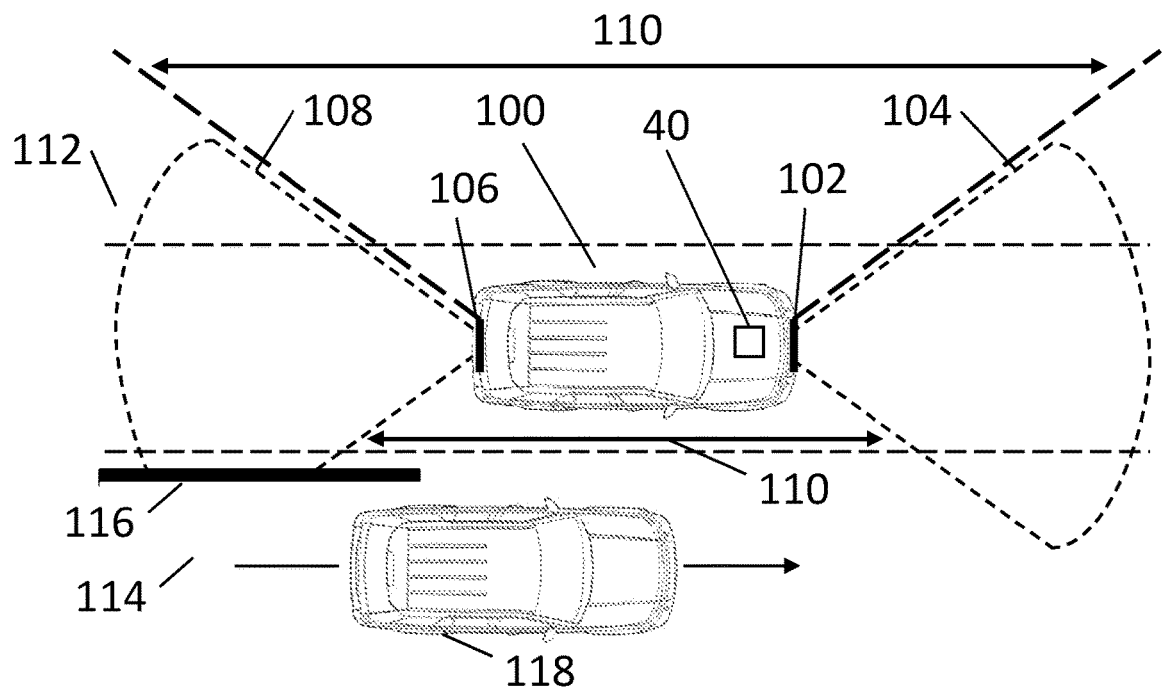
FIGS. 5a and 5b show a vehicle comprising a controller according to FIG. 2.

FIG. 5a shows a vehicle 100 comprising a controller 40 in accordance with an embodiment of the present invention. The vehicle 100 has a detection means 46 comprising a forward facing detection means 102 having a field of view 104 (it is noted that the detection means 102 may comprise an arrangement of sensors 3, 5 as shown in FIG. 1 or an alternative arrangement of sensors). The vehicle 100 also comprises a rearward facing detection means 106 having a field of view 108.

It can be seen from FIG. 5a that there is a gap in the coverage of the detection means 102, 106 such that there are lateral non-detection regions 110 to either side of the vehicle.

FIG. 5a shows one situation in which another road user could have entered the lateral non-detection region 110 without having been detected by either the forward or rear detection means 102, 106.

As shown in FIG. 5a, the vehicle 100 is travelling along a route 112 that has merged with another route 114, routes 112 and 114 having been separated by a barrier (wall 116).

As shown in FIG. 5a, vehicle 118 which is travelling on route 114 is within the lateral non-detection region 110 of vehicle 100 at the point that the two vehicles 100, 118 clear the barrier 116.

In such road configurations the processor 48 of the controller 40 may be arranged to automatically generate a vehicle speed control signal in accordance with embodiments of the present invention in order to vary the speed of vehicle 100 relative to vehicle 118 such that vehicle 118 appears in the field of view (104, 108) of one of the detection means (102, 106).

Figure 5B:
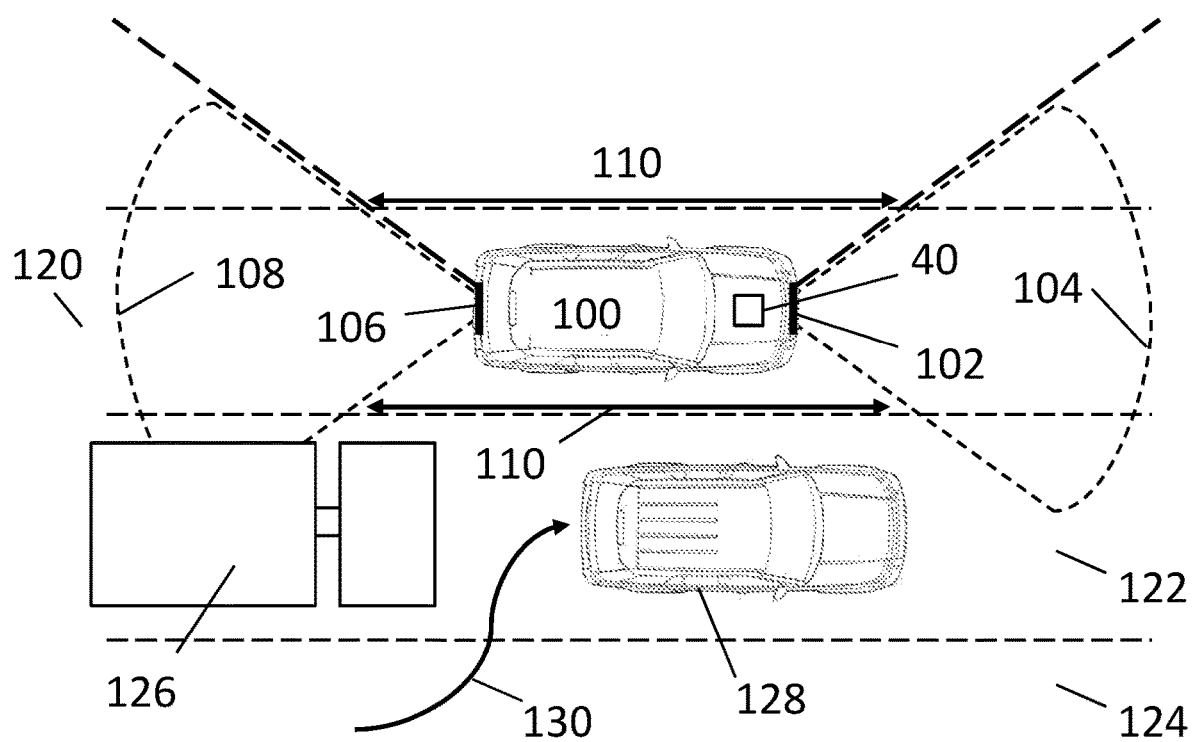

FIG. 5b shows a further situation in which another road user could have entered the lateral non-detection region 110 without having been detected by either the forward or rear detection means 102, 106.

As show in in FIG. 5b, vehicle 100 is travelling along a multi lane road (120, 122, 124) in the lane 120. A high sided vehicle 126 is located in lane 122 just behind and to the right of vehicle 100. A third vehicle 128 is shown manoeuvring from lane 124 into lane 122 in front of the vehicle 126.

As a result of vehicle 126 blocking the field of view of the rearward sensor 106 it can be seen that vehicle 128 has entered the lateral non-detection region 110 of vehicle 100.

To counter such scenarios the processor 48 of the controller 40 may be arranged to generate a vehicle speed control signal whenever another vehicle 126 is detected in the field of view 108 of its detection means. Alternatively, the processor 48 may be arranged to periodically generate such a vehicle speed control signal.

FIGS. 5a and 5b show two of situations in which a road user may have entered a non-detection region of the vehicle 100. It is noted that the embodiments of the present invention described herein may also be used in conjunction with "high definition" mapping technologies in which road infrastructure (such as number of lanes, walls, junctions, tunnels etc.) and traffic conditions may be used as an input to initiate the method according to FIG. 3 above. It is further noted that in situations where vehicle to vehicle communication is possible then messages exchanged in such environments may also be used to initiate the methods according to embodiments of the present invention (for example if the vehicle has received messages from three vehicles in the vicinity but can only "see" two vehicles via the detection means then the processor 48 may be arranged to output a vehicle speed control signal 50 as described herein). Vehicles that are adapted to receive cloud based data services may also be arranged to trigger the methods described herein (e.g. in response to a weather update or a traffic update).

Figure 6:
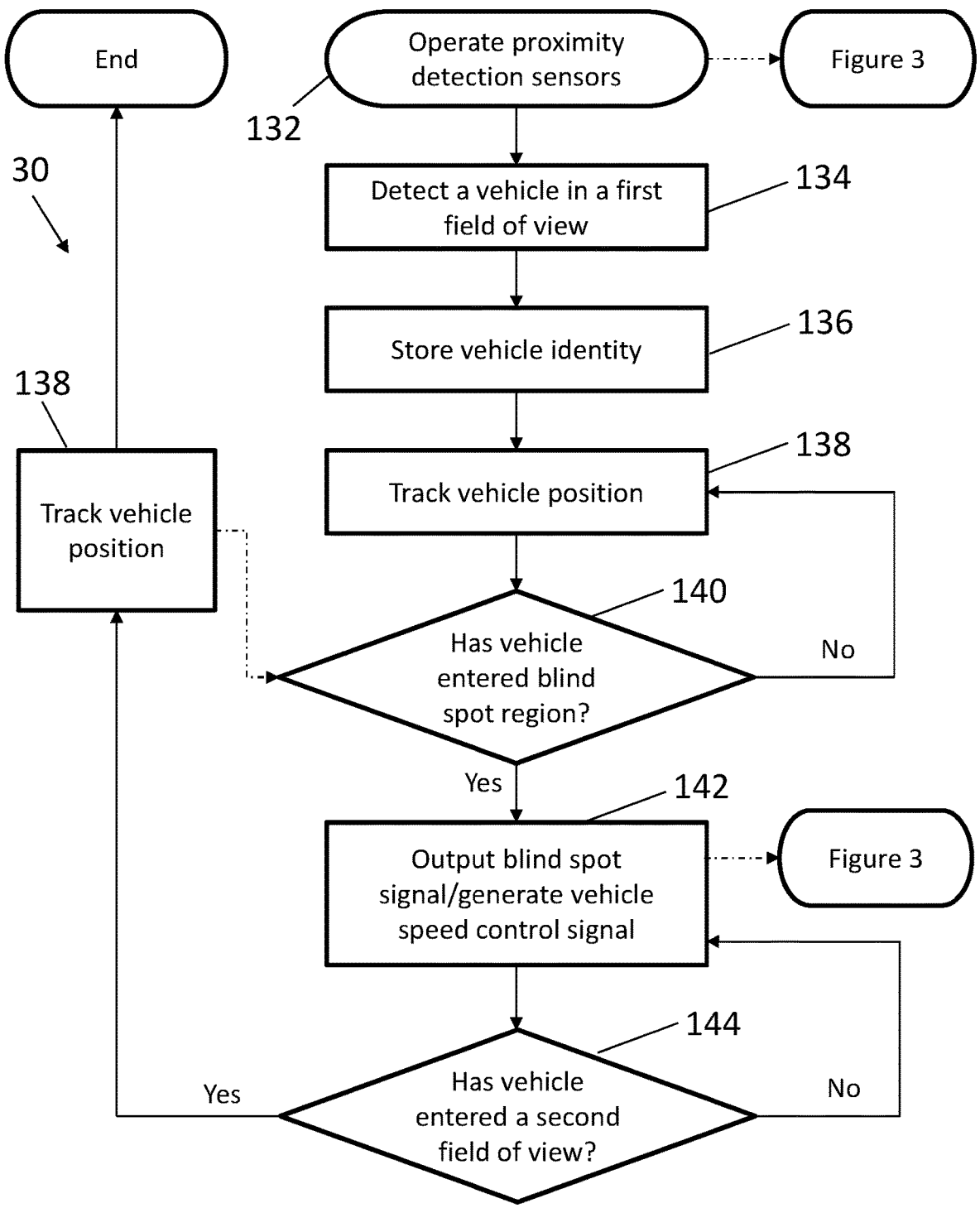
FIG. 6 shows a method of tracking an object according to an embodiment of the present invention.
Figure 7A:
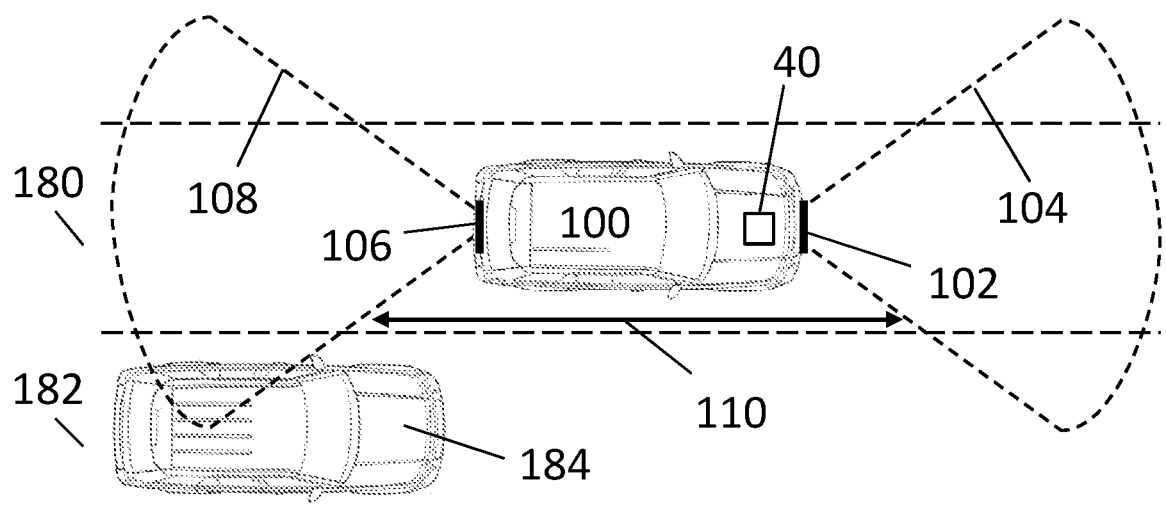
FIGS. 7a, 7b and 7c show a vehicle tracking an object using the method of FIG. 6.
Figure 7B:
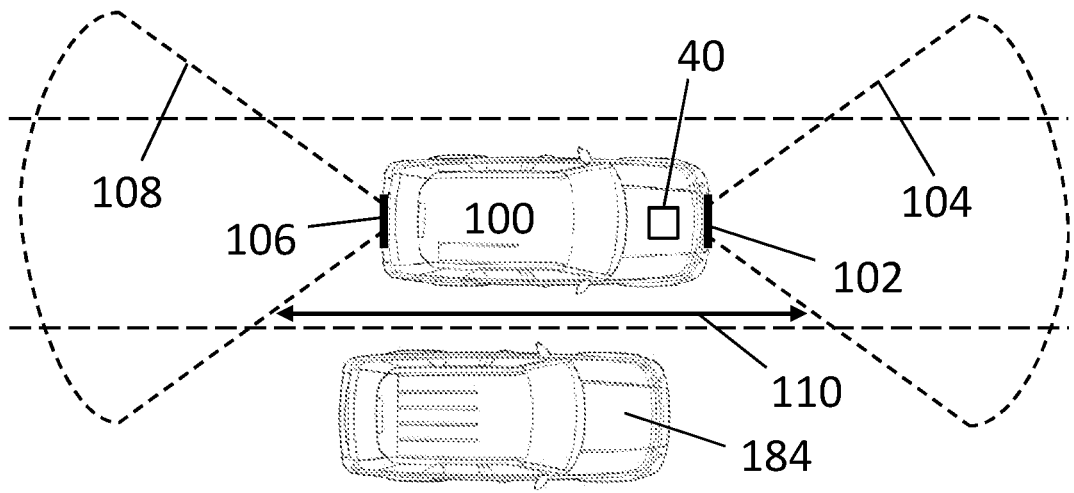
Figure 7C:
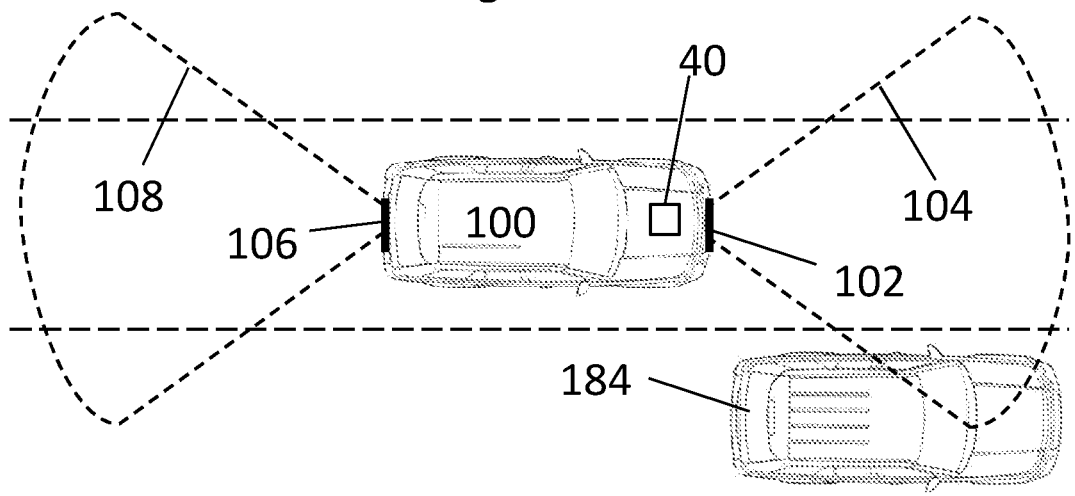

FIG. 6 is a flow chart illustrating a vehicle tracking method that may be used in conjunction with the method of FIG. 3. FIGS. 7a, 7b and 7c show the tracking of a vehicle in accordance with the method of FIG. 6.

As shown in FIGS. 7a, 7b and 7c, a vehicle 100 comprises a controller 40 in accordance with embodiments of the present invention. Vehicle 100 is travelling along a multi lane road (lanes 180 and 182).

In step 132 the detection means 46, 102, 106 are operated and an object detection signal is received at the input 42 of the controller 40. It is noted that at this point the controller 40 may additionally initiate the method according to FIG. 3.

In step 134 a vehicle 184 is detected in a first field of view. For example the vehicle 184 (see FIGS. 7a, 7b and 7c) may be detected in the rearward facing field of view 108 of vehicle 100. In the road situation shown in FIGS. 7a, 7b and 7c there is a delta speed difference between the vehicle 100 and vehicle 184, with vehicle 184 travelling at a greater speed.

In step 136, vehicle 184 is classified and its identity stored in a data store associated with the controller 40. The vehicle 184 may be classified using pattern recognition techniques based on camera sensor data (e.g. colour detection of the vehicle 184, number plate recognition of vehicle 184 and/or identification of the vehicle type).

In step 138 the vehicle 184 is tracked by the controller 40. Periodically, in step 140, the controller determines whether the trajectory of the vehicle 184 has taken it into the lateral non-detection region 110 of the vehicle 100.

In the event that the vehicle 184 is still visible then the process cycles round again to tracking step 138.

In the event that the vehicle 184 has been determined to enter the non-detection region 110 then a non-detection flag is raised in step 142 by the processor 40. The non-detection flag may cause the processor to generate a vehicle speed control signal (as shown in step 62 of FIG. 3). Alternatively, the controller 40 may output a non-detection signal via output 54 to a driver notification system (e.g. dashboard alert) or to another vehicle system (such as an autonomous driving system), e.g. to stop or prevent lane changes.

In step 144 the processor checks if the vehicle 184 has entered a second field of view of the vehicle 100. It is noted that this field of view may be the forward facing field of view 104 of detection means 102. Alternatively, in the event that the delta speed of vehicle 184 relative to vehicle 100 has turned negative, the vehicle 184 may re-enter the field of view 108 of detection means 106.

If the vehicle 184 has not reappeared in a field of view (104, 108) of vehicle 100 then the process moves back to step 142 and the processor 48 checks again to see if vehicle 184 has reappeared in a field of view.

If vehicle 184 has re-entered a field of view then the processor resumes its tracking function in step 138. Subsequently the process may return to step 140 or, in the event that the vehicle 184 pulls either far enough ahead or falls far enough behind vehicle 100 the process of FIG. 6 may end as far as vehicle 184 is concerned.

It is noted that the above controller and method of operating the controller have been described in the context of a vehicle having forward and rearward facing sensors only. It is to be appreciated however that the controller and method of operating the controller in accordance with embodiments of the present invention may be used in conjunction with a vehicle having additional side mounted sensors. In such an arrangement the presently described controller and method of operation may provide an additional layer of object detection over and above the side mounted sensors.

Many modifications may be made to the above examples without departing from the scope of the present invention as defined in the accompanying claims.

The invention claimed is:

1. A controller for controlling a vehicle, the vehicle comprising a detection means having a detection zone and a lateral non-detection region, the controller comprising:
   an input for receiving an object detection signal from the detection means
   a processor configured to generate a control signal for controlling a vehicle system in dependence on the received object detection signal; and
   an output for outputting the control signal
   wherein
   the processor is configured to generate a vehicle speed control signal to vary a vehicle speed about a current vehicle speed in order to bring a potential object in a lateral direction of the vehicle into the detection zone of the detection means;
   and the output is configured to output the vehicle speed control signal.

2. A controller as claimed in claim 1, wherein the input is configured to receive an input signal and the processor is configured to generate the vehicle speed control signal in dependence on receiving the input signal.

3. A controller as claimed in claim 2, wherein the input signal comprises one or more of: a user command entered via a vehicle input device; a signal generated upon operation of a vehicle indicator system; a signal generated by an advance driver assistance system; a GPS signal; or the object detection signal from the detection means.

4. A controller as claimed in claim 1, wherein the processor is configured to
   detect an object within the detection zone in dependence on the object detection signal received from the detection means;
   track the object;
   determine whether the object presents a hazard to lateral movement of the vehicle; and
   generate the control signal for controlling the vehicle system in dependence on determining whether the object presents a hazard to lateral movement of the vehicle.

5. A controller as claimed in claim 4, wherein tracking the object includes determining one or more of a speed, position, acceleration or trajectory of the object based on the object detection signal.

6. A controller as claimed in claim 4, wherein the processor is configured to determine that the object presents a hazard to lateral movement of the vehicle if a determined trajectory of the object takes the object into the lateral non-detection region.

7. A controller as claimed in claim 4, wherein determining whether the object presents a hazard to lateral movement of the vehicle includes:
   determining relative motion of the object while the object remains within the detection zone; and
   determining one or more of:
   a first likelihood of the object moving into the lateral non-detection region based on the relative motion;
   a second likelihood of the object occupying a position within the lateral non-detection region; and
   a third likelihood of the object returning into the detection zone.

8. A controller as claimed in claim 4, wherein the vehicle system includes an autonomous lane change system and the control signal affects control of the autonomous lane change system to prevent the vehicle from changing lanes while the object presents a hazard to lateral movement of the vehicle.

9. A controller as claimed in claim 4, wherein the vehicle system includes a lane change assistance system and the control signal affects control of the lane change assistance system to indicate the hazard to lateral motion of the vehicle.

10. A controller as claimed in claim 4, wherein detecting the object within the detection zone includes identifying a vehicle by one or more of pattern recognition, color detection or license plate recognition.

11. A controller as claimed in claim 1, wherein the object detection signal includes one or more of: computer vision data, image data, radar signal data or LIDAR signal data.

12. A controller as claimed in claim 1, wherein the detection means comprises one of more of: a camera, a LIDAR sensor or a radar sensor.

13. A controller as claimed in claim 1, wherein the detection means is arranged on the vehicle such that the detection zone includes a forward field of view and a rearward field of view and the lateral non-detection region is situated in an area between the forward field of view and the rearward field of view.

14. A controller as claimed in claim 13, wherein the detection zone includes a vertical field of view spanning less than 35 degrees and the lateral non-detection region is outside of the vertical field of view.

15. A controller as claimed in claim 13, wherein the detection zone includes a forward horizontal field of view in a direction of travel of the vehicle and a rearward horizontal field of view opposite to the direction of travel and the lateral non-detection region is outside the forward and rearward horizontal fields of view.

16. A controller as claimed in claim 1, wherein the lateral non-detection region comprises a region extending at least partially alongside the vehicle at all times.

17. A controller as claimed in claim 1, wherein the vehicle speed control signal controls the vehicle speed in accordance with a variable speed sequence.

18. A vehicle comprising a controller according to claim 1.

19. A method of controlling a vehicle, the vehicle comprising a detection means having a detection zone and a lateral non-detection region, the method comprising:
receiving at an input of a controller an object detection signal from the detection means;
generating at a processor of the controller a control signal for controlling a vehicle system in dependence on the received objection detection signal;
outputting at an output of the controller the control signal;
generating at the processor a vehicle speed control signal to vary a vehicle speed about a current vehicle speed in order to bring a potential object in a lateral direction of the vehicle into the detection zone; and
outputting from the output the vehicle speed control signal.

20. A non-transitory, computer-readable storage medium storing instructions that, when executed by one or more processors, causes the one or more processors to carry out the method of claim 19.

* * * * *